United States Patent
Lee et al.

(10) Patent No.: US 11,951,968 B2
(45) Date of Patent: Apr. 9, 2024

(54) ELECTRONIC PARKING BRAKE CONTROL APPARATUS AND METHOD

(71) Applicant: HYUNDAI MOBIS CO., LTD., Seoul (KR)

(72) Inventors: Sang Hyun Lee, Yongin-si (KR); Jung Hoon Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 344 days.

(21) Appl. No.: 17/488,596

(22) Filed: Sep. 29, 2021

(65) Prior Publication Data
US 2022/0396249 A1   Dec. 15, 2022

(30) Foreign Application Priority Data

Jun. 11, 2021  (KR) .................. 10-2021-0076151

(51) Int. Cl.
*B60T 8/88*   (2006.01)

(52) U.S. Cl.
CPC ......... *B60T 8/885* (2013.01); *B60T 2270/402* (2013.01); *B60T 2270/406* (2013.01); *B60T 2270/415* (2013.01)

(58) Field of Classification Search
CPC .......... B60T 7/12; B60T 13/746; B60T 17/18; F16D 65/18; F16D 2125/40; B60W 10/18; B60W 40/10; B60W 50/029; B60W 50/14; B60W 2520/28
See application file for complete search history.

(56) References Cited

U.S. PATENT DOCUMENTS

| 10,293,799 B2* | 5/2019 | Beauvais | B60T 8/171 |
| 11,046,289 B2* | 6/2021 | Michels | F16D 65/14 |
| 2006/0071548 A1* | 4/2006 | Scheider | G01R 31/007 303/122.04 |

(Continued)

FOREIGN PATENT DOCUMENTS

| DE | 19751431 A1 | 7/1999 |
| DE | 102013009025 A1 | 12/2013 |

(Continued)

OTHER PUBLICATIONS

German Office Action dated Feb. 2, 2022 in corresponding German Patent Application No. 102021124495.1.

(Continued)

*Primary Examiner* — John Kwon
*Assistant Examiner* — Johnny H Hoang
(74) *Attorney, Agent, or Firm* — NovoTechIP International PLLC

(57) ABSTRACT

An EPB (Electronic Parking Brake) control apparatus may include: a first EPB switch of an EPB; a first controller connected to two terminals among the plurality of terminals of the first EPB switch, and configured to calculate a first signal value by combining signals received from the two terminals, and diagnose the state of the first EPB switch according to the first signal value, and a second controller connected to the other two terminals among the plurality of terminals of the first EPB switch, and configured to calculate a second signal value by combining signals received from the two terminals, and diagnose the state of the first EPB switch according to the second signal value.

18 Claims, 8 Drawing Sheets

(56) References Cited

U.S. PATENT DOCUMENTS

| | | | | |
|---|---|---|---|---|
| 2007/0114843 A1* | 5/2007 | Kawahara | ............... | B60T 13/74 |
| | | | | 303/122 |
| 2008/0262687 A1* | 10/2008 | Fujita | ...................... | B60T 17/18 |
| | | | | 701/70 |
| 2009/0195058 A1* | 8/2009 | Jackson | ................ | B60T 13/683 |
| | | | | 303/20 |
| 2009/0254237 A1* | 10/2009 | Takahashi | ............. | B60T 17/221 |
| | | | | 701/31.4 |
| 2013/0314222 A1* | 11/2013 | Park | ...................... | B60T 13/741 |
| | | | | 340/453 |
| 2022/0297548 A1* | 9/2022 | Oh | .......................... | B60T 7/122 |

FOREIGN PATENT DOCUMENTS

| | | |
|---|---|---|
| KR | 10-2010-0116782 A | 11/2004 |
| KR | 100911570 B1 | 8/2009 |
| KR | 1020130131918 A | 12/2013 |
| KR | 1020150062426 A | 6/2015 |

OTHER PUBLICATIONS

Office Action dated Apr. 7, 2023 in the corresponding Korean Patent Application No. 10-2021-0076151.

\* cited by examiner

| FAILURE | LOCATION | NEUTRAL | APPY | RELEASE | NOTE |
|---|---|---|---|---|---|
| Open | SW1 | 2013 | 2013 | 2013 | |
| | SW4 | 2013 | 2013 | 2013 | |
| | SW2 | 2013 | 2013 | 2013 | |
| | SW3 | 2013 | 2013 | 2013 | |

| FAILURE | LOCATION | NEUTRAL | APPY | RELEASE | NOTE |
|---|---|---|---|---|---|
| BAT Short | SW1 | 3333 | 2233 | 3333 | |
| | SW4 | 3113 | 3333 | 3333 | |
| | SW2 | 2233 | 3333 | 3333 | |
| | SW3 | 3333 | 3333 | 3113 | |

FIG. 7B

| FAILURE | LOCATION | NEUTRAL | APPY | RELEASE | NOTE |
|---|---|---|---|---|---|
| GND Short | SW1 | 0011 | 0000 | 0000 | |
| | SW4 | 0000 | 1001 | 0000 | |
| | SW2 | 0000 | 0000 | 0011 | |
| | SW3 | 2002 | 0000 | 0000 | |

FIG. 7C

ELECTRONIC PARKING BRAKE CONTROL APPARATUS AND METHOD

CROSS-REFERENCE TO RELATED APPLICATIONS

This application claims priority from and the benefit of Korean Patent Application No. 10-2021-0076151, filed on Jun. 11, 2021, which is hereby incorporated by reference for all purposes as if set forth herein.

BACKGROUND OF THE INVENTION

1. Field of the Invention

Exemplary embodiments of the present disclosure relate to an EPB (Electronic Parking Brake) control apparatus and method for a vehicle, and more particularly, to an EPB control apparatus and method which can check the state of an EBP system using a signal inputted from an EPB of a vehicle, and switch control in case of a failure, such that the vehicle can travel.

2. Discussion of Related Art

In general, an autonomous vehicle refers to a vehicle that autonomously acquires outside information without a driver's operation, monitors the surrounding situation, determines the road condition, and travels to the destination.

Based on an autonomous driving system installed in the autonomous vehicle, the autonomous vehicle controls a brake to decelerate or stop the vehicle according to the surrounding situation, by using communication inside the vehicle.

When emergency braking is required while the vehicle travels in an autonomous driving mode, a main controller transmits a braking signal and controls the brake to stop the vehicle. At this time, when the brake is abnormal, the vehicle may operate an EPB to perform braking.

The EPB may be operated through a simple button operation even though a driver does not manually operate a parking brake, and maintain a parking or stopping state of the vehicle by controlling a braking force which is automatically applied to a wheel, in order to prevent the vehicle from being pushed backward when the vehicle is stopped or started on a hill.

The EPB includes an AS (Apply Switch) to enable the EPB and an RS (Release Switch) to disable the EPB.

The EPB is enabled when the AS is turned on by a driver, and disabled when the RS is turned on by the driver.

The EPB may provide various conveniences to a driver. However, when the EPB is abnormally operated by an abnormal signal or the like while the vehicle travels, the vehicle may be suddenly braked or turned, and a braking force may not be normally generated.

Thus, in order to check whether the EPB is normally operated or to secure the reliability of the EBP when the AS and the RS are normally operated, it is necessary to diagnose a switch failure of the EBP.

In the related art, the autonomous vehicle includes two controllers to secure vehicle control redundancy. Thus, although an abnormality occurs in a main controller, a sub controller may be used to control the vehicle. However, although the vehicle includes the two controllers, an EPB switch is configured to input a signal to the main controller. Thus, when an abnormality occurs in the main controller, the sub controller may not control the EPB switch.

When the main controller transmits a signal of the EPB switch to the sub controller through communication, the sub controller may receive the signal of the EPB switch, but a problem may occur in signal synchronization. Thus, there is a limitation in controlling the EPB switch through the sub controller.

The related art of the present disclosure is disclosed in Korean Patent Application Publication No. 10-2010-0116782 published on Nov. 2, 2010 and entitled "Method for Diagnosing Fault in Electric Brake System".

BRIEF SUMMARY OF THE INVENTION

Various embodiments are directed to an EPB (Electronic Parking Brake) control apparatus and method which can divide and input signals of an EPB to two controllers, combine the signals inputted for the respective terminals in order to determine whether signals of an EPB switch are normal, and determine a failure of the controllers or the EPB switch.

Also, various embodiments are directed to an EPB control apparatus and method which include two controllers and one or two EPB switch, and perform control through any one controller when the other controller has failed, in order to secure redundancy.

In an embodiment, an EPB control apparatus may include: a first EPB switch of an EPB; a first controller connected to two terminals among the plurality of terminals of the first EPB switch, and configured to calculate a first signal value by combining signals received from the two terminals, and diagnose the state of the first EPB switch according to the first signal value, and a second controller connected to the other two terminals among the plurality of terminals of the first EPB switch, and configured to calculate a second signal value by combining signals received from the two terminals, and diagnose the state of the first EPB switch according to the second signal value. The first controller may determine whether any one of the first EPB switch, the first controller and the second controller has failed, according to the first signal value, and determines the location and cause of the failure to diagnose a final state of the first EPB switch.

The first controller may be connected to a first terminal and a fourth terminal among the plurality of terminals of the first EPB switch, transmit a first state request signal to the first terminal, and transmit a fourth state request signal, different from the first state request signal, to the fourth terminal, and the second controller may be connected to a second terminal and a third terminal among the plurality of terminals of the first EPB switch, transmit a second state request signal to the second terminal, and transmit a third state request signal, different from the second state request signal, to the third terminal.

When the first EPB switch has failed, the first and second controllers may each determine whether the cause of the failure is an open circuit, a battery short circuit or a ground short circuit, based on the first or second signal value, and determine the location where the failure occurred among the first to fourth terminals of the first EPB switch.

The EPB control apparatus may further include a second EPB switch. The first controller may be connected to a first terminal and a fourth terminal of the second EPB switch, the second controller may be connected to a second terminal and a third terminal of the second EPB switch, and the first and second controllers may each calculate the signal value of the signals received from the second EPB switch, and diagnose the state of the second EPB switch.

In an embodiment, an EPB control method may include: transmitting, by a first controller and a second controller, a state request signal for checking the state of a first EPB switch; calculating, by the first controller, a first signal value by combining signals received from a first terminal and a fourth terminal of the first EPB switch, and diagnosing the state of the first EPB switch; calculating, by the second controller, a second signal value by combining signals received from a second terminal and a third terminal of the first EPB switch, and diagnosing the state of the first EPB switch; diagnosing, by each of the first and second controllers, the state of the first EPB switch based on the second signal value; and determining whether any one of the first EPB switch, the first controller or the second controller has failed, based on the first and second signal values, and determining the location and cause of the failure to diagnose a final state of the first EPB switch.

The EPB control method may further include: transmitting, by each of the first and second controllers, a state request signal for checking the state of a second EPB switch; calculating, by each of the first and second controllers, a signal value by combining the signals received from the second EPB switch, and diagnosing the state of the second EPB switch; diagnosing, by the first or second controller, whether any one of the first and second EPB switch has failed; and switching control to the second EPB switch to generate a braking force through the second EPB switch, when the first EPB switch has failed.

The first and second state request signals may be 1001, and the third and fourth state request signals may be 0011.

The diagnosing of the state of the first EPB switch may include determining that the first EPB switch is in a neutral state when the first signal value is 3013, determining that the first EPB switch is in an apply state when the first signal value is 2033, and determining that the first EPB switch is in a release state when the first signal value is 3033; and determining that the first EPB switch is in the neutral state when the second signal value is 2033, determining that the first EPB switch is in the apply state when the second signal value is 3033, and determining that the first EPB switch is in the release state when the second signal value is 3013.

The diagnosing of the final state of the first EPB switch may include determining that the failure was caused by an open circuit in the first or fourth terminal, when the first signal value is 2013, and determining that the failure was caused by an open circuit in the second or third terminal, when the second signal value is 2013.

The diagnosing of the final state of the first EPB switch may include determining that the failure was caused by a battery short circuit in the first or fourth terminal, when the first signal value is any one of 3333, 2233 and 3113, and determining that the failure was caused by a battery short circuit in the second or third terminal, when the second signal value is any one of 3333, 2233 and 3113.

The diagnosing of the final state of the first EPB switch may include determining that the failure was caused by a ground short circuit in the first or fourth terminal, when the first signal value is any one of 0000, 0011 and 1001, and determining that the failure was caused by a ground short circuit in the second or third terminal, when the second signal value is any one of 0000, 0011 and 2002.

In accordance with the embodiments of the present disclosure, the two controllers may each combine the signals received from the EPB switch and thus easily diagnose a failure of the controller or the EPB switch, which makes it possible to perform emergency control on the vehicle.

Furthermore, the two controllers may apply different state request signals for the respective terminals and receive signals of the EPB switch, which makes it possible to improve the identifiability of the signals and to more accurately determine the state of the EPB switch.

Furthermore, braking redundancy in vehicle control may be secured through two controllers and at least one EPB switch. Thus, although a failure occurs, the vehicle may be easily controlled, which makes it possible to prevent an accident and to improve stability.

BRIEF DESCRIPTION OF THE DRAWINGS

FIGS. 6A to 6D are graphs illustrating signals of terminals ch2 and ch3 of the EPB switch in accordance with the embodiment of the present disclosure.

FIGS. 7A to 7C are tables showing output signals for the respective causes of failures in the EPB control apparatus in accordance with the embodiment of the present disclosure.

DETAILED DESCRIPTION OF THE INVENTION

Figure 1:
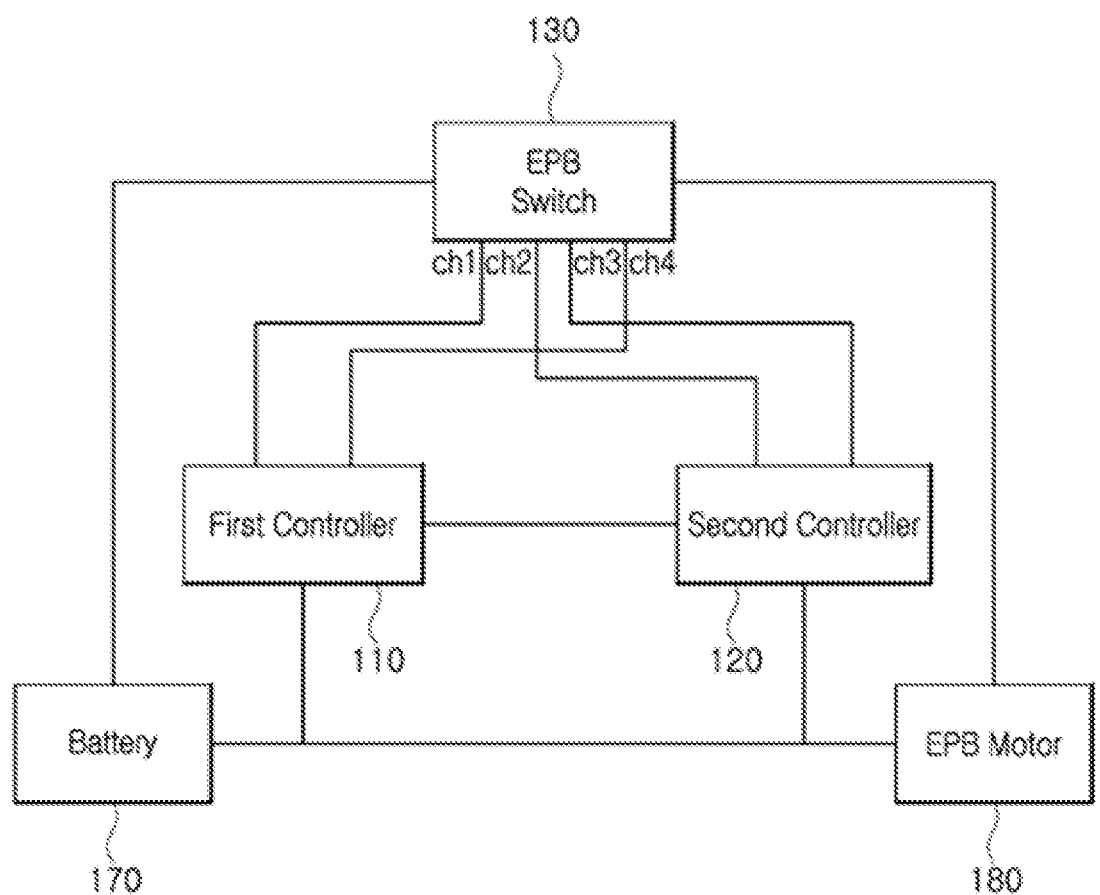
FIG. 1 is a block diagram briefly illustrating a configuration of an EPB (Electronic Parking Brake) control apparatus in accordance with a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an EPB (Electronic Parking Brake) control apparatus and method will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block diagram briefly illustrating a configuration of an EPB (Electronic Parking Brake) control apparatus in accordance with a first embodiment of the present disclosure.

As illustrated in FIG. 1, the EPB control apparatus in accordance with the first embodiment of the present disclosure includes a first controller 110, a second controller 120 and an EPB switch 130.

The EPB control apparatus is connected to an EPB motor 180 and a battery 170 to operate the EPB. The EPB motor 180 is connected to the EPB switch 130 and operated by an operation of the EPB switch 130, and the battery 170 is configured to supply operation power to the EPB motor 180.

The EPB control apparatus is installed in a vehicle, and the vehicle further includes a steering device, an air conditioning system, and components (transmission, battery and battery management system) depending on a power source (engine or motor). However, the descriptions thereof will be omitted herein.

An EPBS (Electronic Parking Brake System) applies power of the battery 170 to the EPB motor 180 in response to an operation of the EPB switch 130, and the EPB motor 180 is driven to operate an EPB actuator (not illustrated) to generate a braking force. The EPB is enabled or disabled by an operation of the EPB switch 130.

The EPB switch 130 includes a plurality of terminals ch1 to ch4. Among the plurality of terminals, a pair of terminals are connected to the first controller 110, and another pair terminals are connected to the second controller 120.

For example, the first and fourth terminals ch1 and ch4 are connected to the first controller 110, and the second and third terminals ch2 and ch3 are connected to the second controller 120. The connections between the terminals and the controllers are only an example, and may be changed.

The first controller 110 operates as a main controller, and controls operations of components within the vehicle while transmitting/receiving data to/from the respective components through a communication bus.

The second controller 120 serves as a sub controller to assist the first controller, and monitors the first controller to determine whether the first controller is abnormal. When an abnormality occurs in the first controller or the connection or communication with the first controller is abnormal, the second controller 120 acquires a control authority to control the vehicle, and performs a backup operation.

Until an ignition switch is turned off after the vehicle is started, each of the first and second controllers 110 and 120 periodically transmits a state request signal to the EPB switch 130, and determines whether the EPB switch 130 is normally operated.

Furthermore, the first and second controllers 110 and 120 diagnose a failure based on not only the state of the EPB switch but also the connections between the EPB switch and the controllers or the states of the controllers.

The first and second controllers 110 and 120 each apply the state request signal to the EPB switch 130, and then receive signals of the EPB switch 130, corresponding to the state request signal.

The first and second controllers 110 and 120 each receive the signals of the EPB switch 130 through the terminals connected to the EPB switch 130, and combine the received signals to determine the state of the controller or the state of the EPB switch 130.

The first and second controllers 110 and 120 each calculate the signal value of the signals of the EPB switch 130 by combining the received signals, and determine whether the EPB switch 130 normally operates, based on the calculated signal value.

The first and second controllers 110 and 120 each check the state of the EPB switch and diagnose a failure thereof, based on the value of the signals received from the EPB switch 130.

When determining that the signal of the EPB switch 130 is normal, both of the first and second controllers 110 and 120 finally determine that the EPB switch 130 normally operates. When any one of the first and second controllers 110 and 120 determines that the signal of the EPB switch 130 is abnormal, the controller which determines that the signal of the EPB switch 130 is normal acquires the control authority to control the vehicle.

Furthermore, the first and second controllers 110 and 120 determine the apply, release and neutral states of the EPB switch 130 based on the signal of the EPB switch 130, and determine whether the EPB switch 130 is open or short-circuited, thereby diagnosing the cause of a failure in the EPB switch and the location of the terminal where the failure occurred.

Figure 2:
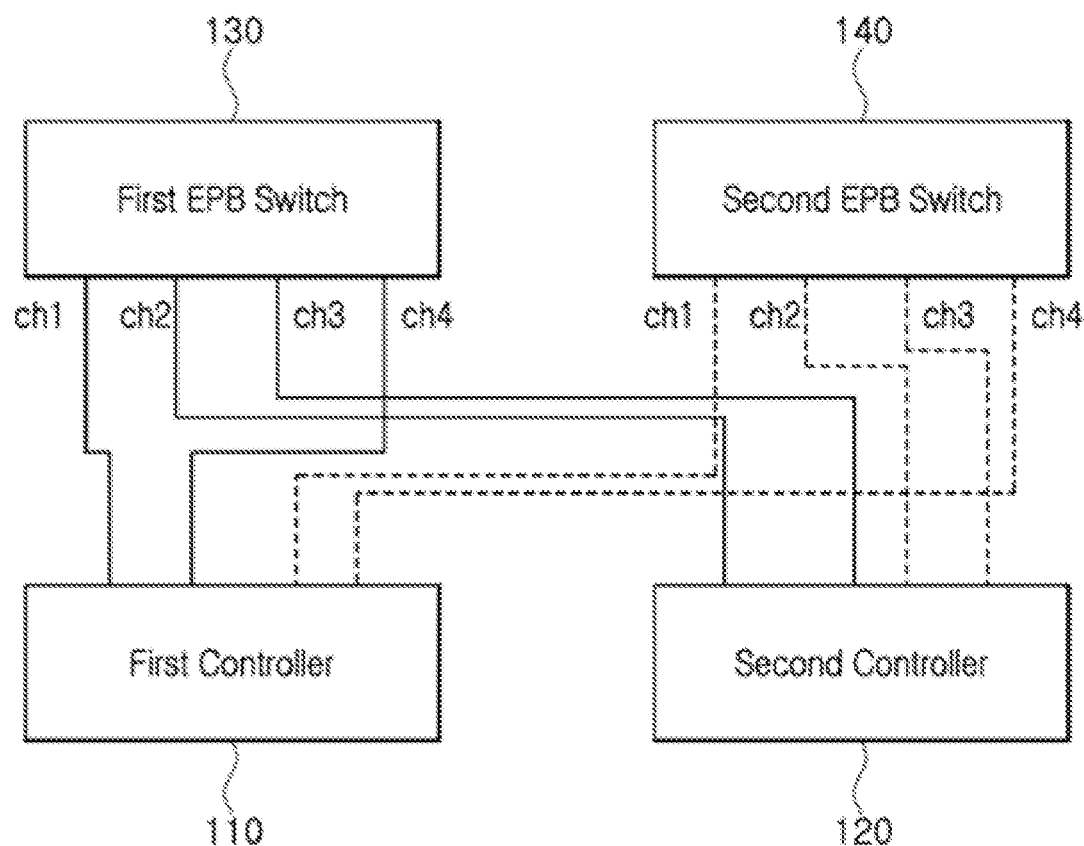
FIG. 2 is a diagram illustrating a configuration of an EPB control apparatus in accordance with a second embodiment of the present disclosure.

FIG. 2 is a diagram illustrating a configuration of an EPB control apparatus in accordance with a second embodiment of the present disclosure.

As illustrated in FIG. 2, the EPB control apparatus in accordance with the second embodiment of the present disclosure includes a first controller 110, a second controller 120, a first EPB switch 130 and a second EPB switch 140.

As described above with reference to FIG. 1, the EPB control apparatus is connected to the battery 170 and the EPB motor 180, and generates a braking force through the operation of the first or second EPB switch 130 or 140.

The same components as those described with reference to FIG. 1 will be represented by like reference numerals, and the descriptions thereof will be omitted herein.

The first EPB switch 130 serves as a main switch, and applies battery power to the EPB motor to generate a braking force according to a manipulation of the switch or a control command of the first or second controller.

The second EPB switch 140 operates as an auxiliary switch of the first EPB switch 130.

When the controller determines that the first EPB switch 130 has failed, the second EPB switch 140 is operated to generate a braking force, in place of the first EPB switch 130.

When the first EPB switch 130 has failed, the first or second controller 110 or 120 switches the control from the first EPB switch 130 to the second EPB switch 140, such that the second EPB switch 140 applies the operation power of the battery 170 to the EPB motor 180. Thus, a braking force is generated.

The first EPB switch 130 includes a plurality of terminals ch1 to ch4. Among the plurality of terminals, a pair of terminals are connected to the first controller 110, and another pair of terminals are connected to the second controller 120.

The second EPB switch 140 includes a plurality of terminals ch1 to ch4. Among the plurality of terminals, a pair of terminals are connected to the first controller 110, and another pair of terminals are connected to the second controller 120.

For example, the first and fourth terminals ch1 and ch4 of the first EPB switch 130 are connected to the first controller 110, and the second and third terminals ch2 and ch3 of the first EPB switch 130 are connected to the second controller 120.

Furthermore, the first and fourth terminals ch1 and ch4 of the second EPB switch 140 are connected to the first controller 110, and the second and third terminals ch2 and ch3 of the second EPB switch 140 are connected to the second controller 120.

The first controller 110 receives the signals of the first and fourth terminals ch1 and ch4 of the first EPB switch 130, and receives the signals of the first and fourth terminals ch1 and ch4 of the second EPB switch 140.

The second controller 120 receives the signals of the second and third terminals ch2 and ch3 of the first EPB switch 130, and receives the signals of the second and third terminals ch2 and ch3 of the second EPB switch 140.

The first and second controllers 110 and 120 each check the states of the first and second EPB switches 130 and 140 and diagnose whether a failure occurred, based on the values of the signals received from the first and second EPB switches 130 and 140.

As described above, the first and second controllers 110 and 120 are cross-matched with the first and second EPB switches 130 and 140, such that the terminals of each of the first and second EPB switches 130 and 140 are connected by two to each of the first and second controllers 130 and 140. Thus, the first and second controllers 110 and 120 determine the final states of the EPB switches based on the signals of the two EPB switches.

The first controller 110 may receive four signals from the first and second EPB switches 130 and 140, and the second controller 120 may receive four signals from the first and second EPB switches 130 and 140, in order to determine the states of the first and second EPB switches based on a total of eight signals. When a failure occurs in any one of the EPB switches, the first and second controllers may determine that the signals received from the corresponding EPB switch are abnormal, thereby easily determining the failure of the EPB switch.

The first and second controllers 110 and 120 each diagnose an abnormality of the controller or a failure in connection state between the controller and the EPB switches, based on the signals received from the first and second EPB switches 130 and 140.

For example, when the first controller determines that the signal of the first EPB switch is normal, but the second controller determines that the signal of the first EPB switch is abnormal, it may indicate that the second controller or the connection between the second controller and the first EPB switch is abnormal. The EPB control apparatus in accordance with the second embodiment of the present disclosure includes two controllers, i.e. the first and second controllers 110 and 120, and two switches, i.e. the first and second EPB switches 130 and 140. In response to a failure of any one controller, the EPB control apparatus may switch the control such that the other normal controller controls the vehicle. Furthermore, in response to a failure of any one of the EPB switches, the EPB control apparatus may control vehicle braking through the other normal EPB switch. Thus, the EPB control apparatus may control the vehicle even in an emergency situation such as a failure.

Figure 3A:
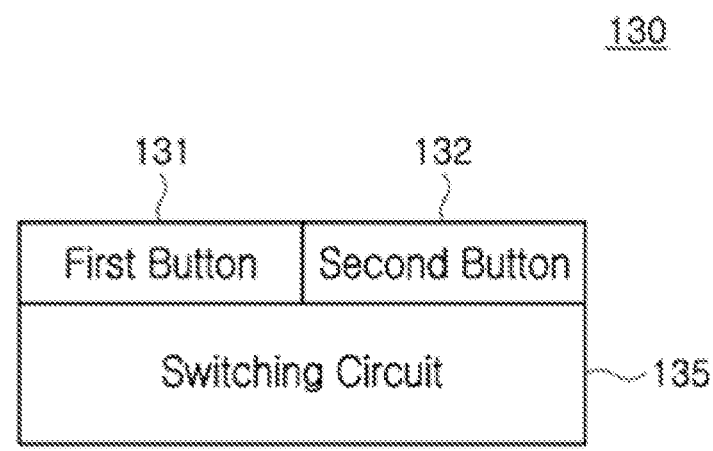
FIGS. 3A and 3B are diagrams illustrating a configuration of an EPB switch in accordance with an embodiment of the present disclosure.
Figure 3B:
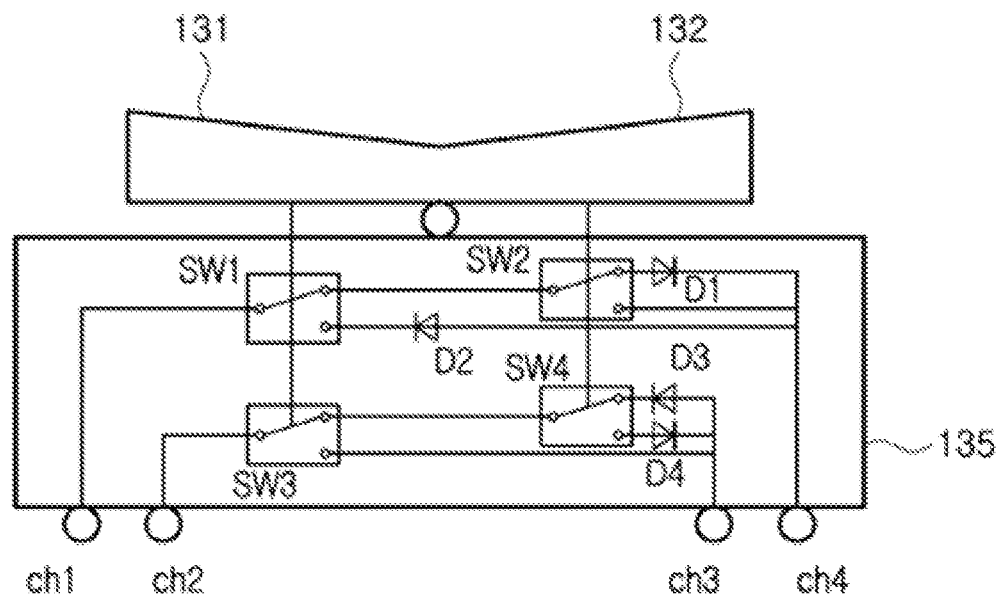

FIGS. 3A and 3B are diagrams illustrating a configuration of an EPB switch in accordance with an embodiment of the present disclosure.

As illustrated in FIG. 3A, the EPB switch 130 includes a first button 131, a second button 132, a plurality of terminals ch1 to ch4 and a switching circuit 135. The second EPB switch 140 is configured in the same manner, and the descriptions thereof will be omitted herein.

The first and second buttons of the EPB switch 130 are manipulated to change the configuration through the internal connections of the switching circuit 135, thereby changing signals to be outputted through the plurality of terminals ch1 to ch4.

The first button 131 applies an apply signal to the switching circuit 135, and the second button 132 applies a release signal to the switching circuit 135.

The first and second buttons 131 and 132 are manipulated by a driver. Furthermore, the first and second buttons 131 and 132 may be operated through an operation of a foot brake (not illustrated) or according to a signal of a vehicle key. For example, the apply signal may be applied to the EPB switch 130 when the ignition switch is turned off or the vehicle key is located at a predetermined distance from the vehicle, or the release signal is applied to the EPB switch 130 when the vehicle key is located at a designated location. Then, a parking brake is enabled or disabled.

As illustrated in FIG. 3B, the switching circuit 135 includes a plurality of switches SW1 to SW4, a plurality of diodes D1 to D4 and the plurality of terminals ch1 to ch4 connected to the first or second controller 110 or 120.

The first and second buttons 131 and 132 apply the apply signal and the release signal, respectively, to the switching circuit 135. When the first and second buttons 131 and 132 are released, the neutral signal is applied.

The first and second buttons 131 and 132 may be configured as one switch. The first and second buttons 131 and 132 may apply signals corresponding to the case in which one switch is pulled and the case in which the one switch is pushed, respectively, or one end and the other end of one switch may operate as the first and second buttons, respectively.

As any one of the first and second buttons 131 and 132 is manipulated, the apply signal, the release signal or the neutral signal is inputted to the switching circuit 135. In response to the input signal, the plurality of switches SW1 to SW4 are operated to change the internal circuit configuration. As the circuit configuration of the switching circuit 135 is changed, the signals outputted through the plurality of terminals ch1 to ch4 are changed.

When the apply signal is inputted to the switching circuit 135, first and third switches SW1 and SW3 are operated. When the release signal is inputted to the switching circuit 135, second and fourth switches SW2 and SW4 are operated.

The first and second controllers 110 and 120 each apply a state request signal to the EPB switch 130 in a predetermined time period, and receive signals as a response to the state request signal.

The first controller 110 receives the signals of the first and fourth terminals ch1 and ch4, and the second controller 120 receives the signals of the second and third terminals ch2 and ch3.

When each of the apply signal, the release signal and the neutral signal is inputted to the EPB switch 130, the first and second controllers 110 and 120 compare the signals outputted through the plurality of terminals to the reference values of the respective signals, in order to diagnose a failure of the EPB switch 130.

Figure 4A:
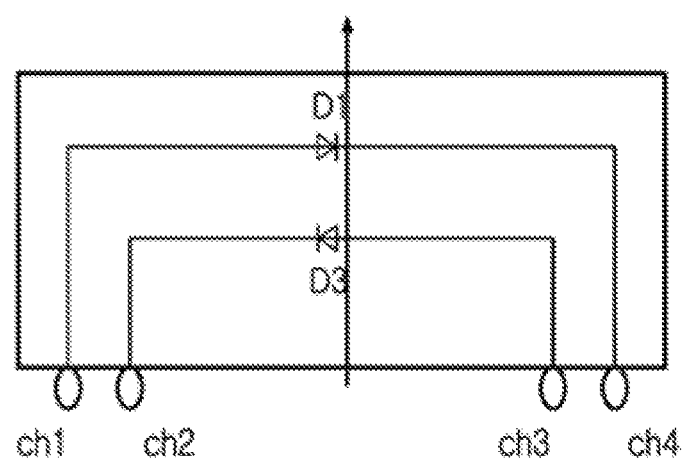
FIGS. 4A to 4C are diagrams for describing a configuration of a circuit which is formed according to a button operation of the EPB switch illustrated in FIG. 3.
Figure 4B:
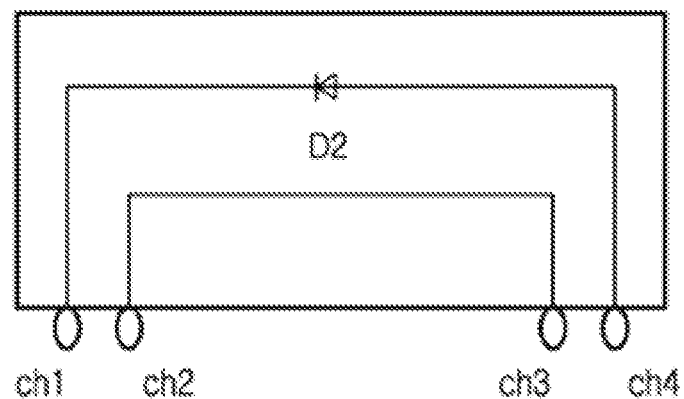
Figure 4C:
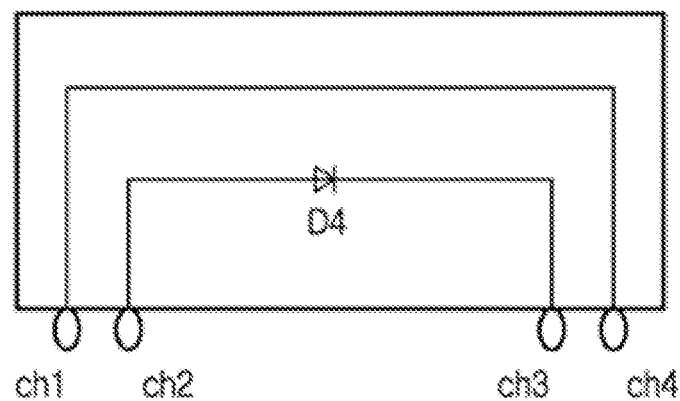

FIGS. 4A to 4C are diagrams for describing a configuration of a circuit which is formed according to a button operation of the EPB switch illustrated in FIGS. 3A and 3B.

As illustrated in FIG. 4A, when the neutral signal is inputted to the switching circuit 135, a first diode D1 is connected to the first and fourth terminals ch1 and ch4, and a third diode D3 is connected to the second and third terminals ch2 and ch3.

When the neutral signal is inputted to the switching circuit 135, the first switch SW1 connected to the first terminal ch1 is connected to the second switch SW2, the second switch SW2 is connected to the first diode D1 and connected to the fourth terminal ch4, the third switch SW3 connected to the second terminal ch2 is connected to the fourth switch SW4, and the fourth switch SW4 is connected to the third diode D3 and connected to the third terminal ch3.

As illustrated in FIG. 4B, when the apply signal is inputted to the switching circuit 135, a second diode D2 is connected to the first and fourth terminals ch1 and ch4, and the second and third terminals ch2 and ch3 are connected to each other.

When the apply signal is inputted to the switching circuit 135, the first switch SW1 connected to the first terminal ch1 is connected to the second diode D2, the second diode D2 is connected to the fourth terminal ch4, and the third switch SW3 connected to the second terminal ch2 is connected to the third terminal ch3.

As illustrated in FIG. 4C, when the release signal is inputted to the switching circuit 135, the first and fourth terminals ch1 and ch4 are connected to each other, and a fourth diode D4 is connected to the second and third terminals ch2 and ch3.

When the release signal is inputted to the switching circuit 135, the first switch SW1 connected to the first terminal ch1 is connected to the second switch SW2, the second switch SW2 is connected to the fourth terminal ch4, the third switch SW3 connected to the second terminal ch2 is connected to the fourth switch SW4, and the fourth switch SW4 is connected to the fourth diode D4 and connected to the third terminal ch3.

FIGS. 5A to 5D are graphs illustrating the signals of the terminals ch1 and ch4 of the EPB switch in accordance with the embodiment of the present disclosure.

The following descriptions will be focused on the first EPB switch 130, the EPB switch described without 'first' or 'second' may indicate the first EPB switch 130 of the first embodiment or the first EPB switch 130 of the second embodiment, and the contents on the EPB switch may be applied in the same manner to the second EPB switch 140.

Figure 5A:
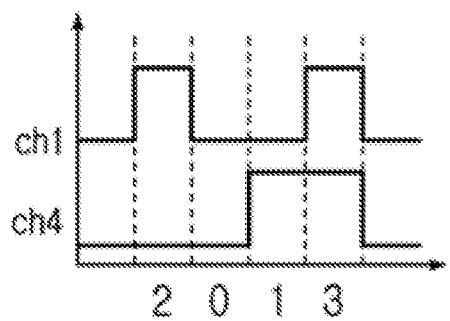
FIGS. 5A to 5D are graphs illustrating signals of terminals ch1 and ch4 of the EPB switch in accordance with the embodiment of the present disclosure.
Figure 5B:
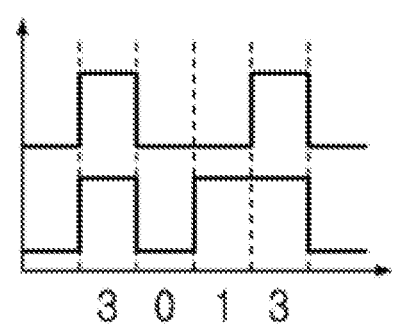
Figure 5C:
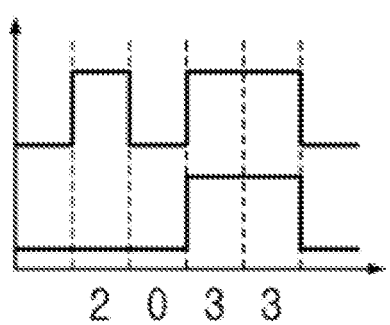
Figure 5D:
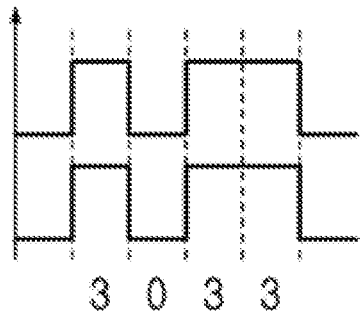

FIG. 5A illustrates the state request signal applied to the EPB switch 130 from the first controller 110, FIG. 5B illustrates an output signal when the EPB switch is in the neutral state, FIG. 5C illustrates an output signal when the EPB switch is in the apply state, and FIG. 5D illustrates an output signal when the EPB switch is in the release state. The output signals of the EPB switch for the respective terminals are inputted to the first controller 110.

As illustrated in FIG. 5A, the state request signal from the first controller 110 is applied to the first and fourth terminals ch1 and ch4 of the EPB switch. The first controller 110 additionally includes 0 and 1 into a signal of 10 in the first terminal ch1 and a signal of 01 in the fourth terminal ch4, in order to request state check.

Thus, a first state request signal of 1001 is applied to the first terminal ch1, and a fourth state request signal of 0011 is applied to the fourth terminal ch4.

When the state request signal is applied to each of the terminals, the EPB switch 130 outputs a signal according to the neutral state, the apply state or the release state.

As the first and fourth terminals of each of the first and second EPB switches 130 and 140 are connected to the first controller 110, the first and second EPB switches 130 and 140 receive the same state request signals for the respective terminals from the first controller 110. When the first and second EPB switches 130 and 140 are in a normal state, the first and second EPB switches 130 and 140 output the same signals to the first controller 110.

As illustrated in FIG. 5B, when a first state request signal of 1001 is applied to the first terminal ch1 and a fourth state request signal of 0011 is applied to the fourth terminal ch4 while the EPB switch is in the neutral state, the circuit described above with reference to FIG. 4A is applied so that the first and second terminals ch1 and ch4 output signals through the first diode D1.

When the first state request signal of 1001 is applied to the first terminal ch1 of the EPB switch, 1001 is applied to the fourth terminal ch4 through the first diode D1. Furthermore, when the fourth state request signal of 0011 is applied to the fourth terminal ch4 of the EPB switch, 0000 is applied to the first terminal ch1 through the first diode D1. Thus, the first terminal ch1 outputs 1001 based on 1001 and 0000, and the fourth terminal ch4 outputs 1011 based on 1001 and 0011.

The first controller 110 receives 1001 from the first terminal ch1 of the EPB switch 130, and receives 1011 from the fourth terminal ch4 of the EPB switch 130. The first controller 110 receives the same signals from the first and second EPB switches 130 and 140.

The first controller 110 combines the signals 1001 and 1011 of the first and fourth terminals for the respective digits. Specifically, the first controller 110 combines 1 of the first terminal and 1 of the fourth terminal, recognizes the combined number as a binary number 11, and determines the value of the binary number as a signal value of 3. Furthermore, the first controller 110 combines 0 of the first terminal and 0 of the fourth terminal, recognizes the combined number as a binary number 00, and determines the value of the binary number as a signal value of 0. Furthermore, the first controller 110 combines 0 of the first terminal and 1 of the fourth terminal, recognizes the binary number as a binary number 01, and determines the value of the binary number as a signal value of 1. Furthermore, the first controller 110 combines 1 of the first terminal and 1 of the fourth terminal, recognizes the combined number as a binary number 11, and determines the value of the binary number as a signal value of 3. Thus, the first controller 110 determines that the signal value (first signal value) of the first and fourth terminals is 3013.

When the signal value of 3013 is calculated based on the signals of the first and fourth terminals, the first controller 110 determines that the EPB switch is in the neutral state and normally operates. When the same signals are received from the first and fourth terminals of the first and second EPB switches and the signal value of 3013 is calculated, the first controller 110 determines that the two EPB switches are in the neutral state and normally operate.

As illustrated in FIG. 5C, when the first state request signal of 1001 is applied to the first terminal ch1 and the fourth state request signal of 0011 is applied to the fourth terminal ch4 while the EPB switch 130 is in the apply state, the circuit described above with reference to FIG. 4B is applied so that the first and fourth terminals ch1 and ch4 output signals through the second diode D2.

When the first state request signal of 1001 is applied to the first terminal ch1, 0000 is applied to the fourth terminal ch4 through the second diode D2. Furthermore, when the fourth state request signal of 0011 is applied to the fourth terminal ch4, 0011 is applied to the first terminal ch1 through the second diode D2. Thus, the first terminal ch1 outputs 1011 based on 1001 and 0011, and the fourth terminal ch4 outputs 0011 based on 0000 and 0011.

The first controller 110 receives 1011 from the first terminal ch1 of the EPB switch 130, and receives 0011 from the fourth terminal ch4 of the EPB switch 130. The first controller 110 receives the same signals from the first and second EPB switches 130 and 140.

The first controller 110 combines the signals 1011 and 0011 of the first and fourth terminals for the respective digits, and calculates the signal value of the first and fourth terminals. The first controller 110 sequentially combines the signal of the first terminal and the signal of the fourth terminal for the respective digits, recognizes the combined numbers 10, 00, 11 and 11 as binary numbers, calculates the signal values of the respective binary numbers as 2, 0, 3 and 3, and combines the signal values. Thus, the first controller 110 determines that the signal value of the first and fourth terminals is 2033.

When the signal value of 2033 is calculated based on the signals of the first and fourth terminals, the first controller 110 determines that the EPB switch is in the apply state and the signals are normal. When the same signals are received from the first and fourth terminals of the first and second EPB switches and the signal value of 2033 is calculated, the controller 110 determines that the two EPB switches are in the apply state, and normally operate.

As illustrated in FIG. 5D, when the first state request signal of 1001 is applied to the first terminal ch1 and the fourth state request signal of 0011 is applied to the fourth terminal ch4 while the EPB switch 130 is in the release state, the circuit described above with reference to FIG. 4C is applied so that the first and fourth terminals ch1 and ch4 output signals.

When the first state request signal of 1001 is applied to the first terminal ch1, 1001 is applied to the fourth terminal ch4. Furthermore, when the fourth state request signal of 0011 is applied to the fourth terminal ch4, 0011 is applied to the first terminal ch1. Thus, the first terminal ch1 outputs 1011 based on 1001 and 0011, and the fourth terminal ch4 outputs 1011 based on 1001 and 0011.

The first controller 110 receives 1011 from the first terminal ch1 of the EPB switch 130, and receives 1011 from the fourth terminal ch4 of the EPB switch 130. The first controller 110 receives the same signals from the first and second EPB switches 130 and 140.

The first controller 110 combines the signals 1011 and 1011 of the first and fourth terminals ch1 and ch4 for the respective digits, and calculates the signal value of the first and fourth terminals ch1 and ch4. The first controller 110 sequentially combines the signal of the first terminal and the signal of the fourth terminal for the respective digits, recognizes the combined numbers 11, 00, 11 and 11 as binary numbers, calculates the signal values of the respective binary numbers as 3, 0, 3 and 3, and combines the signal values. Thus, the first controller 110 determines that the signal value of the first and fourth terminals is 3033.

When the signal value of 3033 is calculated based on the signals of the first and fourth terminals, the first controller 110 determines that the EPB switch is in the release state and the signals are normal. When the same signals are received from the first and fourth terminals of the first and second EPB switches and the signal value of 3033 is calculated, the controller 110 determines that the two EPB switches are in the release state, and normally operate.

FIGS. 6A to 6D are graphs illustrating the signals of the terminals ch2 and ch3 of the EPB switch in accordance with the embodiment of the present disclosure.

Figure 6A:
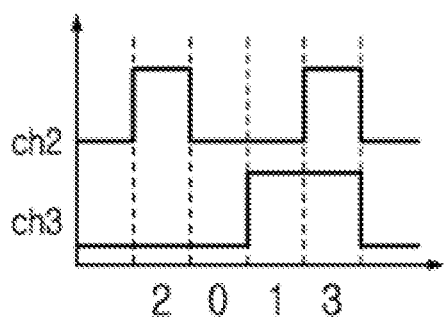
Figure 6B:
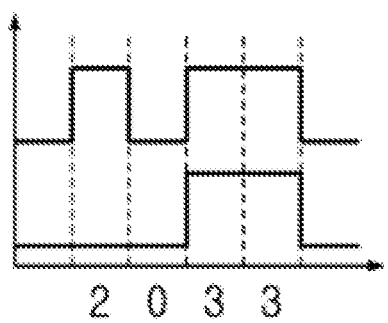
Figures 6C, 6D, 7A:
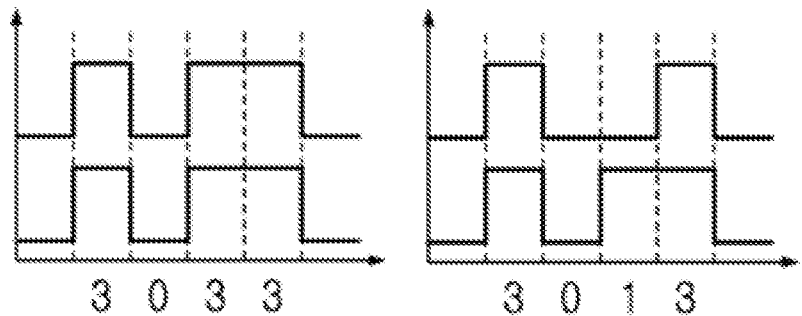

FIG. 6A illustrates the state request signal applied to the EPB switch 130 from the second controller 120, FIG. 6B illustrates an output signal when the EPB switch is in the neutral state, FIG. 6C illustrates an output signal when the EPB switch is in the apply state, and FIG. 6D illustrates an output signal when the EPB switch is in the release state. The output signals of the EPB switch for the respective terminals are inputted to the second controller.

As illustrated in FIG. 6A, the state request signal from the second controller 120 is applied to the second and third terminals ch2 and ch3 of the EPB switch. The second controller 120 applies a second state request signal of 1001 to the second terminal ch2, and applies a third state request signal of 0011 to the third terminal ch3.

When the state request signals are applied to the respective terminals, the EPB switch 130 outputs a signal according to the neutral state, the apply state or the release state.

As the second and third terminals of each of the first and second EPB switches 130 and 140 are connected to the second controller 120, the first and second EPB switches 130 and 140 receive the same state request signals for the respective terminals from the second controller 120. When the first and second EPB switches 130 and 140 are in a normal state, the first and second EPB switches 130 and 140 output the same signals to the second controller 120.

As illustrated in FIG. 6B, when the second state request signal of 1001 is applied to the second terminal ch2 and the third state request signal of 0011 is applied to the third terminal ch3 while the EPB switch 130 is in the neutral state, the circuit described above with reference to FIG. 4A is applied so that the second and third terminals ch2 and ch3 output the signals through the third diode D3.

When the second state request signal of 1001 is applied to the second terminal ch2, 0000 is applied to the third terminal ch3 through the third diode D3. Furthermore, when the third state request signal of 0011 is applied to the third terminal ch3, 0011 is applied to the second terminal ch2 through the third diode D3. Thus, the second terminal ch2 outputs 1011 based on 1001 and 0011, and the third terminal ch3 outputs 0011 based on 0000 and 0011.

The second controller 120 receives 1011 from the second terminal ch2 of the EPB switch 130, and receives 0011 from the third terminal ch3. The second controller 120 receives the same signals from the first and second EPB switches 130 and 140, when in the normal state.

The second controller 120 combines the signals 1011 and 0011 of the second and third terminals for the respective digits, and calculates the signal value of the second and third terminals. The second controller 120 sequentially combines the signal of the second terminal and the signal of the third terminal, recognizes the combined numbers 10, 00, 11 and 11 as binary numbers, calculates the signal values of the respective binary numbers as 2, 0, 3 and 3, and combines the signal values. Thus, the second controller 120 determines that the signal value (second signal value) of the second and third terminals is 2033.

When the signal value of 2033 is calculated based on the signals of the second and third terminals, the second controller 120 determines that the EPB switch is in the neutral state and the signals are normal. When the same signals are received from the second and third terminals of the first and second EPB switches and the signal value of 2033 is calculated, the second controller 120 determines that the two EPB switches are in the neutral state, and normally operate.

As illustrated in FIG. 6C, when the second state request signal of 1001 is applied to the second terminal ch2 and the third state request signal of 0011 is applied to the third terminal ch3 while the EPB switch 130 is in the apply state, the circuit described above with reference to FIG. 4B is applied so that the second and third terminals ch2 and ch3 output signals.

When the second state request signal of 1001 is applied to the second terminal ch2, 1001 is applied to the third terminal ch3. Furthermore, when the third state request signal of 0011 is applied to the third terminal ch3, 0011 is applied to the second terminal ch2. Thus, the second terminal ch2 outputs 1011 based on 1001 and 0011, and the third terminal ch3 outputs 1011 based on 1001 and 0011.

The second controller 120 receives 1011 from the second terminal ch2 of the EPB switch 130, and receives 1011 from the third terminal ch3 of the EPB switch 130. The second controller 120 receives the same signals from the first and second EPB switches 130 and 140, when in the normal state.

The second controller 120 combines the signals 1011 and 1011 of the second and third terminals for the respective digits, and calculates the signal value of the second and third terminals. The second controller 120 sequentially combines the signal of the second terminal and the signal of the third terminal for the respective digits, recognizes the combined numbers 11, 00, 11 and 11 as binary numbers, calculates the signal values of the respective binary numbers as 3, 0, 3 and 3, and combines the signal values. Thus, the second controller 120 determines that the signal value of the second and third terminals is 3033.

When the signal value of 3033 is calculated based on the signals of the second and third terminals, the second controller 120 determines that the EPB switch is in the apply state and the signals are normal. When the same signals are received from the second and third terminals of the first and second EPB switches and the signal value of 3033 is calculated, the second controller 120 determines that the two EPB switches are in the apply state, and normally operate.

As illustrated in FIG. 6D, when the second state request signal of 1001 is applied to the second terminal ch2 and the third state request signal of 0011 is applied to the third terminal ch3 while the EPB switch 130 is in the release state, the circuit described above with reference to FIG. 4C is applied so that the second and third terminals ch2 and ch3 output the signals through the fourth diode D4.

When the second state request signal of 1001 is applied to the second terminal ch2, 1001 is applied to the third terminal ch3 through the fourth diode D4. Furthermore, when the third state request signal of 0011 is applied to the third terminal ch3, 0000 is applied to the second terminal ch2 through the fourth diode D4. Thus, the second terminal ch2 outputs 1001 based on 1001 and 0000, and the third terminal ch3 outputs 1011 based on 0011 and 1001.

The second controller 120 receives 1001 from the second terminal ch2 of the EPB switch 130, and receives 1011 from the third terminal ch3 of the EPB switch 130. The second controller 120 receives the same signals from the first and second EPB switches 130 and 140, when in the normal state.

The second controller 120 combines the signals 1001 and 1011 of the second and third terminals for the respective digits, and calculates the signal value of the second and third terminals. The second controller 120 sequentially combines the signal of the second terminal and the signal of the third terminal for the respective digits, recognizes the combined numbers 11, 00, 01 and 11 as binary numbers, calculates the signal values 3, 0, 1 and 3 of the respective binary numbers, and combines the signal values. Thus, the second controller 120 determines that the signal value of the second and third terminals is 3013.

When the signal value of 3013 is calculated based on the signals of the second and third terminals, the second controller 120 determines that the EPB switch is in the release state and the signals are normal. When the same signals are received from the second and third terminals of the first and second EPB switches and the signal value of 3013 is calculated, the second controller 120 determines that the two EPB switches are in the release state, and normally operate.

When the first and second controllers each apply a two-digit state request signal to the EPB switch or sequentially apply signals of 1 to the respective terminals of the EPB switch, the first and second controllers cannot identify a failure caused by an open or short circuit of the EPB switch, and thus apply a four-digit signal as the state request signal to each terminal of the EPB switch.

Furthermore, when the first and second controllers communicate with each other, the first and second controllers may recognize the signals received from the EPB switch as binary numbers, and calculate the signal value of the signals, thereby removing a problem in signal synchronization.

Thus, since the state request signal of the first controller and the state request signal of the second controller are applied to the respective terminals of the EPB switch, and the 4-digit signals different from each other are applied for the respective terminals, different signals are outputted from the respective terminals of the EPB switch, corresponding to the 4-digit signals. Therefore, it is possible to accurately determine the state of the EPB switch, and to distinguish between a failure of the EPB switch and a failure of a controller or a failure in connection between the controller and the EPB switch.

Since the first and fourth terminals of each of the first and second EPB switches 130 and 140 are connected to the first controller 110, the first controller 110 receives the same signals for the same state request signals. When the received signals are different from each other, the first controller 110 compares the signal values of the signals to determine the states of the first and second EPB switches 130 and 140.

Since the second and third terminals of each of the first and second EPB switches 130 and 140 are connected to the second controller 120, the second controller 120 receives the same signals for the same state request signals. When the received signals are different from each other, the second controller 120 compares the signal values of the signals to determine the states of the first and second EPB switches 130 and 140.

The first and second controllers 110 and 120 may determine an abnormality of the EPB switch, an abnormality of the controller and an abnormality between the controller and the EPB switch (communication line abnormality), based on the signal value calculated by analyzing the signals received through the respective terminals, and finally determine a failure through communication with each other.

For example, when the signal value of the first EPB switch 130 is 3013 and the signal value of the second EPB switch 140 is 2013 while the EPB switches are in the neutral state, the first controller 110 may determine that the second EPB switch has failed. Furthermore, when the signal value of the first EPB switch 130 is 2033 and the signal value of the second EPB switch 140 is 2013 while the EPB switches are in the neutral state, the second controller 120 may determine that the second EPB switch has failed. Thus, the first controller 110 and the second controller 120 finally determine that the first EPB switch is in the neutral state and the second EPB switch 140 has failed, based on the signal values.

Furthermore, when the signal value of the first EPB switch 130 is 2033 and the signal value of the second EPB switch 140 is 2033, the first controller 110 determines that the first EPB switch 130 is in the apply state, and the signals are normal. Furthermore, when the signal value of the first EPB switch 130 is 2033 and the signal value of the second EPB switch 140 is 3013, the second controller 120 determines that the signals are abnormal and the second controller has failed.

Thus, the first controller 110 finally determines that the second controller 120 is abnormal or the connection between the second controller and the EPB switch is abnormal (communication line abnormality).

FIGS. 7A to 7C are tables showing output signals for the respective causes of failures in the EPB control apparatus in accordance with the embodiment of the present disclosure.

As illustrated in FIGS. 7A to 7C, the first and second controllers 110 and 120 each calculate the signal value of signals received from the EPB switch, and determine whether the EPB switch has failed.

As illustrated in FIG. 7A, the first and second controllers 110 and 120 each determine whether a communication line is disconnected or a failure was caused by an open circuit of the switching circuit of the EPB switch, according to the signal value received from the EPB switch.

When the EPB switch has failed due to an open circuit, the signal value of the signals inputted to the controller is calculated as 2013, regardless of whether the EPB switch is in any one of the neutral state, the apply state and the release state.

Since the signal value of 2013 is not generated while the EPB switch is in the normal state, the first and second controllers 110 and 120 determine that the EPB switch having the signal value of 2013 has failed due to an open circuit.

Furthermore, when any one of the signal values of the signals received from the plurality of terminals of the first EPB switch 130 is 2013, the first and second controllers 110 and 120 may determine that the corresponding terminal or the communication line connected to the corresponding terminal is open-circuited, and determine the location of the failure.

For example, when the signal value of the signals of the first and fourth terminals ch1 and ch4, inputted from the first EPB switch, is 2013 and the signal value of the signals of the second and third terminals ch2 and ch3, inputted from the first EPB switch, is 2033, the first controller 110 may determine that the first EPB switch is in the neutral state, and a failure was caused by an open circuit in the first or fourth terminal.

Since the signal value is calculated as 2013 regardless of the state of the EPB switch and the location of an open circuit, the first controller 110 may determine that a failure due to the open circuit occurred in the terminal which receives the signal having the signal value of 2013.

As illustrated in FIG. 7B, the first and second controllers 110 and 120 may determine whether a failure was caused by a battery short circuit.

When a battery short circuit occurred in the first terminal ch1, the first EPB switch 130 outputs a signal having a signal value of 3333 in case that the first EPB switch 130 is in the neutral state, outputs a signal having a signal value of 2233 in case that the first EPB switch 130 is in the apply state, or outputs a signal having a signal value of 3333 in case that the first EPB switch 130 is in the release state.

When a battery short circuit occurred in the fourth terminal ch4, the first EPB switch 130 outputs a signal having a signal value of 3113 in case that the first EPB switch 130 is in the neutral state, outputs a signal having a signal value of 3333 in case that the first EPB switch 130 is in the apply state, or outputs a signal having a signal value of 3333 in case that the first EPB switch 130 is in the release state.

When a battery short circuit occurred in the second terminal ch2, the first EPB switch 130 outputs a signal having a signal value of 2233 in case that the first EPB switch 130 is in the neutral state, outputs a signal having a signal value of 3333 in case that the first EPB switch 130 is in the apply state, or outputs a signal having a signal value of 3333 in case that the first EPB switch 130 is in the release state.

When a battery short circuit occurred in the third terminal ch3, the first EPB switch 130 outputs a signal having a signal value of 3333 in case that the first EPB switch 130 is in the neutral state, outputs a signal having a signal value of 3333 in case that the first EPB switch 130 is in the apply state, or outputs a signal having a signal value of 3113 in case that the first EPB switch 130 is in the release state.

When the signal value of the signals of the first and fourth terminals of the first EPB switch 130 is 3113, the first controller 110 determines that the failure was caused by the battery short circuit in the fourth terminal of the first EPB switch 130.

When the signal value of the signals of the first and fourth terminals of the first EPB switch 130 is 3333, the first controller 110 determines in which terminal the failure occurred, based on the determination result for the second EPB switch, received from the second controller 120.

When the signal value of the signals received from the second and second terminals of the first EPB switch 130 is 3033, the second controller 120 transmits the signal value to the first controller.

In response to the signal value received from the second controller, the first controller determines that the first EPB switch 130 is in the apply state, and a failure was caused by a battery short circuit in the fourth terminal.

When the signal value of the first and fourth terminals is 2233 while the first EPB switch is in the apply state, the first controller may determine that a failure was caused by a battery short circuit in the first terminal.

As illustrated in FIG. 7C, the first and second controllers 110 and 120 may determine whether a failure was caused by a ground short circuit.

When a ground short circuit occurred in the first terminal ch1, the first EPB switch 130 outputs a signal having a signal value of 0011 in case that the first EPB switch 130 is in the neutral state, outputs a signal having a signal value of 0000 in case that the first EPB switch 130 is in the apply state, or outputs a signal having a signal value of 0000 in case that the first EPB switch 130 is in the release state.

When a battery short circuit occurred in the fourth terminal ch4, the first EPB switch 130 outputs a signal having a signal value of 0000 in case that the first EPB switch 130 is in the neutral state, outputs a signal having a signal value of 1001 in case that the first EPB switch 130 is in the apply state, or outputs a signal having a signal value of 0000 in case that the first EPB switch 130 is in the release state.

When a ground short circuit occurred in the second terminal ch2, the first EPB switch 130 outputs a signal having a signal value of 0000 in case that the first EPB switch 130 is in the neutral state, outputs a signal having a signal value of 0000 in case that the first EPB switch 130 is in the apply state, or outputs a signal having a signal value of 0011 in case that the first EPB switch 130 is in the release state.

When a ground short circuit occurred in the third terminal ch3, the first EPB switch 130 outputs a signal having a signal value of 2002 in case that the first EPB switch 130 is in the neutral state, outputs a signal having a signal value of 0000 in case that the first EPB switch 130 is in the apply state, or outputs a signal having a signal value of 0000 in case that the first EPB switch 130 is in the release state.

When the signal value of the signals of the second and third terminals of the first EPB switch 130 is 0011, the second controller 120 determines that a failure was caused by a ground short circuit in the second terminal of the first EPB switch 130.

When the signal value of the signals of the second and third terminals of the second EPB switch 140 is 2002, the second controller 120 determines that a failure was caused by a ground short circuit in the third terminal of the second EPB switch 140.

When the signal value of the signals of the second and third terminals of the first EPB switch 130 is 0000, the second controller 120 determines in which terminal a failure occurred, based on the determination result of the first controller. When the first controller 110 determines that the first EPB switch is in the neutral state, the second controller 120 determines that a failure was caused by a ground short circuit in the second terminal of the first EPB switch 130.

Thus, the first and second controllers 110 and 120 may not only identify the EPB switch where the failure occurred, but also check the location of the terminal where the failure occurred in the corresponding EPB switch and the cause of the failure.

The first and second controllers 110 and 120 each diagnose a failure of the EPB switch 130, and determine an abnormality of the communication line between the EPB switch 130 and the corresponding controller or an abnormality of the controller.

The first controller 110 and the second controller 120 may each acquire a control authority from any one controller which is determined to have failed, and perform emergency control. Furthermore, the first controller 110 and the second controller 120 may change the control over the EPB switch which is determined to have failed.

For example, when the signal value of the first controller 110 is abnormal, the second controller 120 determines that the first controller has failed, and acquires the control authority to start a backup operation through emergency control.

When it is determined that the first EPB switch 130 has failed, the first controller 110 changes the control to the second EPB switch 140 to maintain driving.

The second controller 120 may output a warning to notify that the emergency control is being performed, while maintaining the driving state through the emergency control. The second controller may output a warning in the form of at least one of a warning light, warning sound and warning message.

Figure 8:
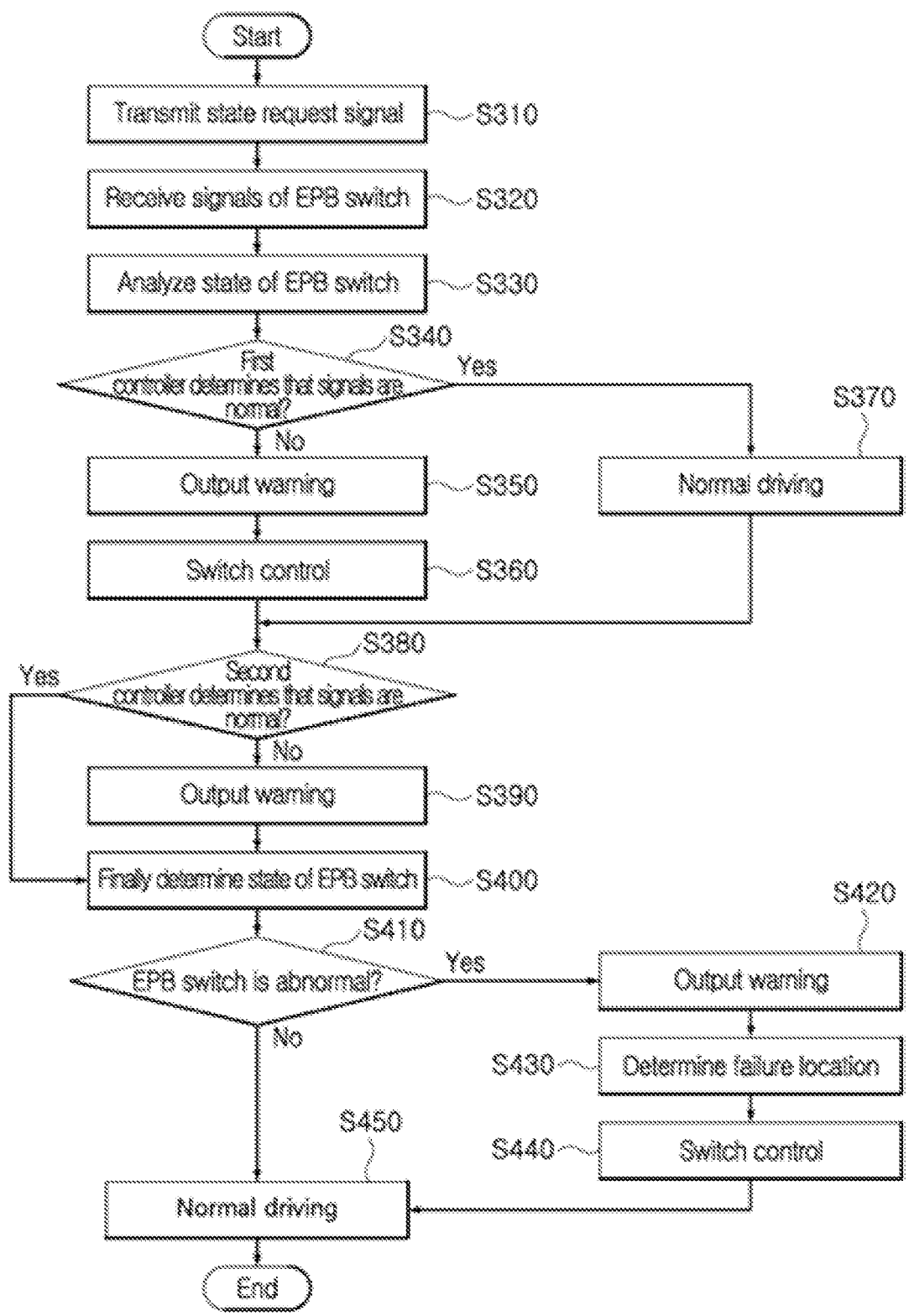
FIG. 8 is a flowchart illustrating a failure diagnosis method of an EPB control apparatus in accordance with an embodiment of the present disclosure.

FIG. 8 is a flowchart illustrating a failure diagnosis method of an EPB control apparatus in accordance with an embodiment of the present disclosure.

As illustrated in FIG. 8, when the ignition switch is turned on to start the vehicle, the first controller 110 controls the operations of the components of the vehicle while communicating with the components. The second controller 120 assists the first controller 110, and monitors the state of the first controller 110.

The first controller 110 is connected to the first and fourth terminals ch1 and ch4 of the EPB switch 130, and the second controller 120 is connected to the second and third terminals ch2 and ch3 of the EPB switch 130. The first and second controllers 110 and 120 each transmit a state request signal for requesting state check in a predetermined time period, in step S310.

From the moment that the ignition switch is turned on to the moment that the ignition switch is turned off after the vehicle is parked, the first and second controllers 110 and 120 may check the state of the EPB switch 130 in the predetermined time period.

As described above with reference to FIGS. 5A and 6A, the first and second controllers each transmit the state request signal to the EPB switch. The first controller 110 transmits 1001 to the first terminal of the EPB switch and transmits 0011 to the fourth terminal of the EPB switch, and the second controller 120 transmits 1001 to the second terminal of the EPB switch and transmits 0011 to the third terminal of the EPB switch. When two EPB switches are provided, the first controller 110 transmits the state request signal to the first and fourth terminals of each of the first and second EPB switches 130 and 140, and the second controller 120 transmits the state request signal to the second and third terminals of each of the first and second EPB switches 130 and 140.

In response to the state request signals received from the controllers, the EPB switch outputs a signal to the first and second controllers through the plurality of terminals (first to fourth terminals ch1 to ch4). Thus, the first controller 110 receives the signals from the first and fourth terminals ch1 and ch4 of the EPB switch 130, and the second controller 120 is connected to the second and third terminals ch2 and ch3 and receives the signals, in step S320.

The first and second controllers 110 and 120 analyze the received signals, combine the analyzed signals for the respective terminals, and calculate the signal value of the combined signals to analyze the state of the EPB switch, in step S330.

The first and second controllers 110 and 120 determine whether the signals are normal, based on the signal value of the EPB switch, in steps S340 and S380. As described with reference to FIGS. 5 to 7, the first and second controllers 110 and 120 calculate the signal value by combining the signals of the EPB switch, and determine whether the signals are normal.

Based on the signals of the EPB switch, the first and second controllers 110 and 120 each determine the state of the EPB switch corresponding to the signal value of the signals, and determine whether the EPB switch or the controller has failed and the communication line between the EPB switch and the corresponding controller is abnormal.

FIG. 8 discloses that the second controller performs signal determination after the first controller performs signal determination. However, the present disclosure is not limited thereto, but the first and second controllers may perform the signal determination at the same time, and the sequence of the signal determination may be changed.

When the signal is normal, the first controller 110 maintains driving (normal operation) in step S370. When the signal is abnormal or the EPB switch or the controller has failed, the first controller 110 outputs a warning in step S350. The warning is outputted in the form of at least one of a warning light, warning message, warning sound and warning voice.

When it is determined that any one controller has failed, the first controller 110 switches the control and performs emergency control, in step S360.

When the determination result of step S380 indicates that the signal is normal, the second controller 120 maintains driving (normal operation). When the determination result of step S380 indicates that the signal is abnormal or the EPB switch or the corresponding controller has failed, the second controller 120 outputs a warning in step S390.

When it is determined that any one controller has failed, the second controller 120 may switch the control and perform emergency control.

During the emergency control, the vehicle is controlled by the normal controller, but the warning is maintained because it is difficult to monitor the state of the corresponding controller and to perform a backup operation.

The first and second controllers 110 and 120 transmit/receive information on the signal of the EPB switch to/from each other, and each finally determine the state of the EPB switch, in step S400.

For example, when the signal value of the signals of the second and third terminals of the first EPB switch 130 is 0000, there are a plurality of failure locations or failure causes for the signal value of 0000. Therefore, the second controller 120 receives the information of the first controller, and finally determines the terminal in which the failure occurred, based on the determination result.

When it is determined that the EPB switch is abnormal, the first or second controller 110 or 120 outputs a warning in step S420.

When it is determined that the EPB switch has failed in case that one EPB switch is provided, the first controller 110 may maintain driving by controlling the vehicle through emergency control. In some cases, the first controller controls the vehicle to be urgently stopped.

When the first EPB switch 130 and the second EPB switch 140 are provided, the first controller 110 identifies an abnormal EPB switch, and switches the control to a normal EPB switch, in step S440.

The first controller 110 switches the control over the EPBT switch or the corresponding controller, and control the operation of the vehicle.

Thus, the vehicle may continuously check the state of the EPB switch, and diagnose not only an abnormality of the controller or the communication line between the controller and the EPB switch, but also a failure location and cause of the EPB switch. Furthermore, when an abnormality occurs, the vehicle may be subjected to emergency control through the control switch between the two controllers or the EPB switches, which makes it possible to perform a backup operation while preparing for an accident.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An Electronic Parking Brake (EPB) control apparatus comprising:
   a first EPB switch having a plurality of terminals;
   a first controller connected to a first pair of the terminals of the first EPB switch, and configured to:
      combine a first pair of signals received from the first pair of the terminals, respectively;
      calculate a first signal value based on the combined first pair of signals; and
      diagnose a state of the first EPB switch based on the first signal value; and
   a second controller connected to a second pair of the terminals of the first EPB switch, and configured to:
      combine a second pair of signals received from the second pair of the terminals, respectively;
      calculate a second signal value based on the combined second pair of signals; and
      diagnose the state of the first EPB switch based on the second signal value,
   wherein the first controller is further configured to:
      determine whether any one of the first EPB switch, the first controller and the second controller exhibits a failure based on the first signal value;
      determine a location and cause of the failure; and
      diagnose a final state of the first EPB switch based on the location and cause of the failure,
   wherein the plurality of terminals of the first EPB switch includes first to fourth terminals,
   wherein the first controller is connected to the first and fourth terminals and configured to transmit a first state request signal to the first terminal,
   wherein the second controller is connected to the second and third terminals and configured to transmit a second state request signal to the second terminal, and transmit a third state request signal to the third terminal, the third state request signal being different from the second state request signal, and
   wherein the first controller is further configured to transmit a fourth state request signal to the fourth terminal, the fourth state request signal being different from the first state request signal.

2. The EPB control apparatus of claim 1, wherein:
   the plurality of terminals of the first EPB switch includes first to fourth terminals,
   the first pair of the terminals comprises the first and fourth terminals, and
   the second pair of the terminals comprises the second and third terminals.

3. The EPB control apparatus of claim 1, wherein the state of the first EPB switch is one of a neutral state, an apply state and a release state.

4. The EPB control apparatus of claim 1, wherein, when the first EPB switch has failed, the first and second controllers are further configured to:
   detect that the first EPB switch exhibits a failure;
   determine, based on the first or second signal value, whether the cause of the failure of the first EPB switch is an open circuit, a battery short circuit or a ground short circuit; and
   determine which one of the first to fourth terminals of the first EPB switch is the location of the failure.

5. The EPB control apparatus of claim 1, wherein:
   The first controller is further configured to receive, from the second controller, the second signal value and the combined second pair of signals, and the first controller diagnoses the final state of the first EPB switch further based on the second signal value and the combined second pair of signals.

6. The EPB control apparatus of claim 1, wherein the second controller is configured to:
detect that the first controller is operating abnormally; and
perform a backup operation for the first controller.

7. The EPB control apparatus of claim 1, further comprising a second EPB switch, wherein:
the second EPB switch has a plurality of terminals including first to fourth terminals,
the first controller is further connected to the first and fourth terminals of the second EPB switch,
the second controller is further connected to the second and third terminals of the second EPB switch,
the first controller is further configured to:
  combine a third pair of signals received from the first and fourth terminals of the second EPB switch;
  calculate a third signal value based on the combined third pair of signals; and
  diagnose a state of the second EPB switch based on the third signal value,
the second controller is further configured to:
  combine a fourth pair of signals received from the second and third terminals of the second EPB switch;
  calculate a fourth signal value based on the combined fourth pair of signals; and
  diagnose the state of the second EPB switch based on the fourth signal value.

8. The EPB control apparatus of claim 7, wherein the first controller is further configured to:
diagnose, based on the first and third signal values, whether the first or second EPB switch has failed, and
in response to diagnosing that the first or second EPB switch has failed, control a normal EPB switch to generate a braking force.

9. An Electronic Parking Brake (EPB) control method comprising:
transmitting, by a first controller and a second controller, a state request signal for checking a state of a first EPB switch, the first EPB switch having a plurality of terminals including first to fourth terminals;
calculating, by the first controller, a first signal value by combining a first pair of signals received from the first and fourth terminals of the first EPB switch;
calculating, by the second controller, a second signal value by combining a second pair of signals received from the second and third terminals of the first EPB switch;
diagnosing, by the first controller, a state of the first EPB switch based on the first signal value;
diagnosing, by the second controllers, the state of the first EPB switch based on the second signal value;
determining whether any one of the first EPB switch, the first controller and the second controller has failed, based on the first and second signal values;
determining a location and cause of the failure; and
diagnosing a final state of the first EPB switch based on the determined location and cause of the failure,
wherein transmitting the state request signal comprises:
  transmitting, by the first controller, a first pair of state request signals to the first and forth terminals, respectively, the first pair of state request signals being different from each other, and
  transmitting, by the second controller, a second pair of the state request signals to the second and third terminals, respectively, the second pair of state request signals being different from each other.

10. The EPB control method of claim 9, wherein:
the first signal value is calculated by combining the first pair of signals from the first and fourth terminals, and
the second signal value is calculated by combining the second pair of signals from the second and third terminals.

11. The EPB control method of claim 9, wherein the state of the first EPB switch is one of a neutral state, an apply state and a release state.

12. The EPB control method of claim 9, wherein the diagnosing the final state of the first EPB switch comprises:
detecting that the first EPB switch has failed;
determining whether the cause of the failure is any one of an open circuit, a battery short circuit and a ground short circuit, based on the first or second signal value; and
determining which one of the first to fourth terminals of the first EPB switch is the location of the failure.

13. The EPB control method of claim 9, further comprising:
transmitting, by each of the first and second controllers, another state request signal for checking the state of a second EPB switch, the second EPB switch having a plurality of terminals including first to fourth terminals;
calculating, by the first controller, a third signal value by combining a third pair of signals received from a third pair of the terminals of the second EPB switch;
calculating, by the second controller, a fourth signal value by combining a fourth pair of signals received from a fourth pair of terminals of the second EPB switch;
diagnosing, by the first or second controller, whether either one of the first and second EPB switches has failed; and
in response to diagnosing that the first EPB switch has failed, controlling the second EPB switch to generate a braking force.

14. The EPB control method of claim 9, wherein:
the state request signals include first to fourth state request signals,
the first pair of the state request signals comprises the first and fourth state request signals,
the second pair of the state request signals comprises the second and third state request signals, and
the first and second state request signals are 1001, and the third and fourth state request signals are 0011.

15. The EPB control method of claim 11, wherein the diagnosing of the state of the first EPB switch comprises:
determining that the first EPB switch is in a neutral state when the first signal value is 3013;
determining that the first EPB switch is in an apply state when the first signal value is 2033;
determining that the first EPB switch is in a release state when the first signal value is 3033;
determining that the first EPB switch is in the neutral state when the second signal value is 2033;
determining that the first EPB switch is in the apply state when the second signal value is 3033; and
determining that the first EPB switch is in the release state when the second signal value is 3013.

16. The EPB control method of claim 12, wherein diagnosing the final state of the first EPB switch comprises:
determining that the failure was caused by an open circuit in the first or fourth terminal when the first signal value is 2013; and determining that the failure was caused by an open circuit in the second or third terminal when the second signal value is 2013.

17. The EPB control method of claim 12, wherein diagnosing the final state of the first EPB switch comprises:
determining that the failure was caused by a battery short circuit in the first or fourth terminal when the first signal value is any one of 3333, 2233 and 3113; and
determining that the failure was caused by a battery short circuit in the second or third terminal when the second signal value is any one of 3333, 2233 and 3113.

18. The EPB control method of claim 12, wherein diagnosing the final state of the first EPB switch comprises:
determining that the failure was caused by a ground short circuit in the first or fourth terminal when the first signal value is any one of 0000, 0011 and 1001; and
determining that the failure was caused by a ground short circuit in the second or third terminal when the second signal value is any one of 0000, 0011 and 2002.

\* \* \* \* \*